(No Model.)
W. R. DALES.
BAIT GUARD.
No. 573,572. Patented Dec. 22, 1896.
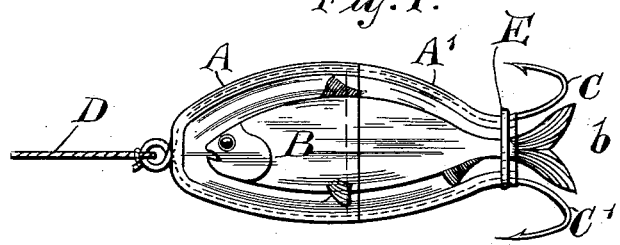
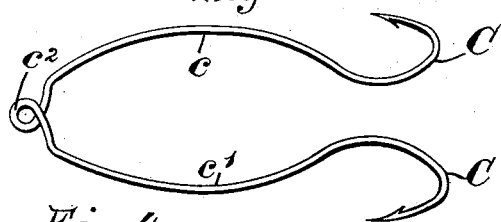
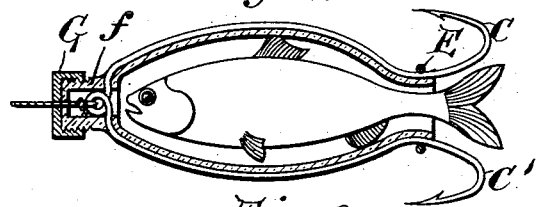
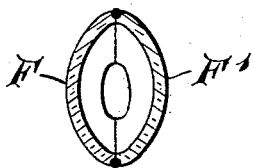
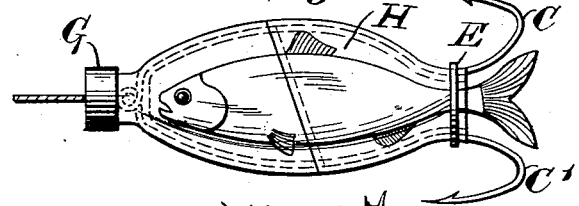
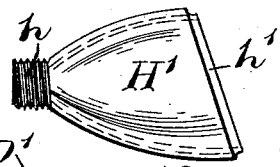
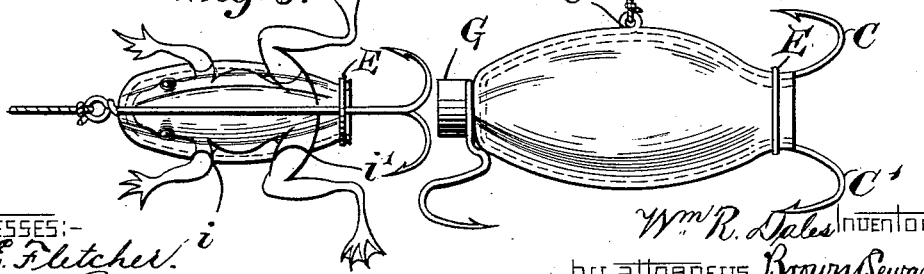
Witnesses:—
M. E. Fletcher.
George Barry Jr.
Wm. R. Dales Inventor
by attorneys Brown Seward
THE NORRIS PETERS CO., PHOTO-LITHO., WASHINGTON, D. C.

United States Patent Office.

WILLIAM R. DALES, OF BROOKLYN, NEW YORK.

BAIT-GUARD.

SPECIFICATION forming part of Letters Patent No. 573,572, dated December 22, 1896.

Application filed April 28, 1896. Serial No. 589,371. (No model.)

*To all whom it may concern:*

Be it known that I, WILLIAM R. DALES, of Brooklyn, in the county of Kings and State of New York, have invented a new and useful Improvement in Bait-Guards, of which the following is a specification.

My invention relates to an improvement in bait-guards, and more particularly to guards adapted to retain live bait and protect them against mutilation by the fish which may bite at them and at the same time permit them to be so exposed as to form an effective attraction to the fish to be caught as to appearance and scent.

In the accompanying drawings, Figure 1 represents one form of the bait-guard as it appears when in use with the live bait therein. Fig. 2 is a view of the bait-guard in detail, its sections being separated a short distance. Fig. 3 is a view in detail of the pair of hooks the shanks of which are utilized in binding the sections of the guard together. Fig. 4 represents one of the half-sections of another form of the guard in which the sections are made to separate longitudinally instead of transversely. Fig. 5 is a transverse section through the same. Fig. 6 is a view in elevation of a third form of the guard in which a quarter-section is made separable from the remaining portion of the guard. Fig. 7 is a view in detail of the removable quarter-section. Fig. 8 is a view in elevation of the guard shaped to accommodate a frog instead of a small fish, and Fig. 9 is a form of the guard adapted for still-fishing as distinguished from trolling.

The material which I prefer for making the body of the guard is glass or other transparent or translucent material, although the guard may be formed of ordinary wire-gauze and serve its purpose with a greater or lesser degree of satisfaction.

As it is desirable to make the guard conform as nearly as possible to the shape of the body of the live bait which is to be incased within it, in order to prevent it from being clumsy in use, and as it is further desirable to provide for the placing of the live bait within the guard without to any serious extent bruising or injuring the bait, I have directed my present invention to the construction of the guard in sections, which may be separated at will for the ready insertion of the bait and which will at the same time form as little resistance as possible when being dragged through the water.

In the form shown in Figs. 1 and 2 the guard is represented as formed of glass and is divided transversely into two sections, (represented, respectively, by A and A'.) I prefer to provide the section A with an annular depression $a$ around the rim of its open end for the reception of a projecting tongue or tenon $a'$, in order to form a comparatively close joint when the two sections are brought together, as shown in Fig. 1. The section A, which is adapted to receive the head and forward portion of the bait-fish, is closed, while the section adapted to receive the tail end of the fish has its rear end $a^2$ open for the projection of the tail $b$ of the bait-fish B.

In binding the two sections A and A' together for use I find it convenient to utilize the shanks of the hooks as follows: The hooks C C' have their shanks $c\ c'$ either formed integral and twisted to form an eye $c^2$ for the attachment of the line D or secured in any well-known or approved manner and extend along the upper and lower edges of the sections A A' from the front to the rear of the guard, a groove $a^3$ being preferably formed along the upper and lower edges of the guard for the reception of the said hook-shanks. At the tail end of the guard a band E is placed snugly around the reduced open end $a^2$ of the section A' and made to embrace the shanks of the hooks, thereby holding the hooks snugly in position and at the same time by holding the shanks of the hooks in the groove holding the guard-sections A A' in assembled adjustment. The band E may be simply a wire of some suitable malleable metal, such, for example, as copper, having its ends twisted or otherwise secured together.

The parts as thus described are assembled for use by placing the tail end of the fish in the section A' with its tail projecting through the open end $a^2$ of the section, then placing the guard-section A over the head of the fish and in engagement with the section A', then springing the shanks $c\ c'$ of the hooks into the groove $a^3$, and finally attaching the band E.

In the form shown in Figs. 4 and 5 the guard is formed in longitudinal half-sections F F', which are held together at their front ends by a screw-cap G, fitted to engage screw-threaded projections $f$, which, when in assembled adjustment, complete a cylindrical screw-threaded nipple, and at their rear ends they are held together by a band E in a manner quite similar to that already described. These longitudinal sections F F' are preferably recessed at their meeting edges to form a groove for the reception of the shanks of the hooks, as hereinabove described.

In the form shown in Figs. 6 and 7 the guard is formed with a removable quarter-section (denoted by H',) the remainder of the guard, (denoted by H) being formed integral. The quarter-section H' is preferably at the head portion or front of the guard, so that the fish may be inserted in a manner quite similar to that in which it is inserted in the form shown in Figs. 1 and 2 and the guard then completed by placing the quarter-section H' in the position shown in Fig. 6. The quarter-section H' is conveniently provided with a screw-threaded projection $h$ for the reception of the binding-cap G, and its opposite edge is provided with a projecting tongue or tenon $h'$, adapted to enter a corresponding under-cut in the body of the guard. In this form, as in the others, the hooks may be retained in position by a band E at the tail end of the guard.

In the form shown in Fig. 8 the guard is shaped to accommodate a frog, and consists of two half-sections similar to those represented in Figs. 4 and 5, with openings $i$ $i'$ upon opposite sides of the guard for the projection of the legs of the frog. The shanks of the hooks are in this instance made to embrace the two half-sections, extending midway along the outside of the upper and lower faces of said sections, as clearly indicated in Fig. 8, and are, as before, held in position by a band E.

In the form shown in Fig. 9 the guard is made in two longitudinal half-sections F F', quite similar to those represented in Fig. 4, the two half-sections being held together by the screw-cap G at one end and the band E at the opposite end. In this form the shank of one of the hooks is provided with an eye $c^3$ about midway of the length of the guard, so that it may be held in a substantially horizontal position by a drop-line D. In this form the hooks are provided at both ends of the guard, so that in whichever direction the fish may grab for the bait the hook will be in position to catch it.

It is obvious that other slight changes might be resorted to in the form and arrangement of the several parts described. Hence I do not wish to limit myself strictly to the forms herein shown and described; but

What I claim is—

1. A fish-guard for live bait adapted to expose more or less of the bait therein to view from the exterior and formed in sections and means for holding the sections in assembled adjustment when in use, substantially as set forth.

2. A fish-guard for live bait constructed to expose the live bait therein to view from the exterior, the said bait-guard being formed in sections and hooks the shanks of which are utilized to hold the sections in assembled adjustment, substantially as set forth.

3. The bait-guard composed of translucent sections for the reception of live bait and provided with a groove extending longitudinally of the guard and hooks, the shanks of which are adapted to rest within the groove, substantially as set forth.

4. The bait-guard comprising translucent sections adapted to receive live bait, hooks the shanks of which are adapted to extend along the opposite sides of the guard and a band arranged to embrace one end of the guard and the shanks of the hooks, substantially as set forth.

5. The bait-guard composed of translucent sections, one of the sections having an open end for the projection of the tail of the bait, a hook having its shank extended lengthwise along the guard for the attachment of the line at the front end of the guard and a band for retaining the hook in position at the tail end of the guard, substantially as set forth.

6. The bait-guard composed of sections separable transversely of the guard, hooks arranged to embrace one end and two opposite sections of the guard and a band for holding the shanks of the hooks to the opposite end of the guard, substantially as set forth.

WILLIAM R. DALES.

Witnesses:
FREDK. HAYNES,
GEORGE BARRY, Jr.